(12) United States Patent
Barker

(10) Patent No.: US 7,544,027 B2
(45) Date of Patent: Jun. 9, 2009

(54) SYSTEM AND METHOD FOR LOADING VEHICLES ONTO THE CARGO BED OF A TRANSPORTING VEHICLE

(76) Inventor: James Barker, P.O. Box 50581, Sparks, NV (US) 89435

( * ) Notice: Subject to any disclaimer, the term of this patent is extended or adjusted under 35 U.S.C. 154(b) by 0 days.

(21) Appl. No.: 11/796,307

(22) Filed: Apr. 28, 2007

(65) Prior Publication Data

US 2008/0265600 A1 Oct. 30, 2008

(51) Int. Cl.
*B60P 3/06* (2006.01)
(52) U.S. Cl. .......................................................... 410/3
(58) Field of Classification Search ............... 410/3, 410/4, 7, 13, 17, 23, 24, 77
See application file for complete search history.

(56) References Cited

U.S. PATENT DOCUMENTS

| | | | | | |
|---|---|---|---|---|---|
| 3,675,795 | A | * | 7/1972 | Dluhy ........................ | 414/234 |
| 5,511,928 | A | * | 4/1996 | Ellis ............................ | 414/462 |
| 5,542,815 | A | * | 8/1996 | Roeling ...................... | 414/812 |
| 5,567,111 | A | * | 10/1996 | Gearin et al. ............... | 414/800 |
| 5,863,173 | A | * | 1/1999 | Bremner ..................... | 414/462 |
| 5,924,835 | A | * | 7/1999 | Ross .......................... | 414/462 |
| 6,217,053 | B1 | * | 4/2001 | Forsythe et al. ........... | 280/414.3 |
| 6,354,777 | B1 | * | 3/2002 | Riekki ........................... | 410/3 |
| 6,413,033 | B1 | * | 7/2002 | Monroig, Jr. ................ | 414/480 |
| 6,450,742 | B1 | * | 9/2002 | Jenkins et al. ............. | 410/29.1 |
| 6,981,835 | B1 | * | 1/2006 | Groth ......................... | 414/462 |
| 7,025,546 | B2 | * | 4/2006 | Clive-Smith ................. | 410/24 |
| 7,147,417 | B2 | * | 12/2006 | Priesgen .................... | 410/104 |
| 7,186,065 | B2 | * | 3/2007 | Clive-Smith ................. | 410/24 |
| 2006/0153656 | A1 | * | 7/2006 | Clive-Smith ................. | 410/24 |
| 2006/0165503 | A1 | * | 7/2006 | Boydstun et al. ............. | 410/24 |
| 2007/0034655 | A1 | * | 2/2007 | Storer ........................ | 224/403 |
| 2007/0189872 | A1 | * | 8/2007 | Omuta ....................... | 410/24 |
| 2007/0206999 | A1 | * | 9/2007 | Clive-Smith ................. | 410/24 |

* cited by examiner

*Primary Examiner*—H Gutman

(57) ABSTRACT

A system and method for loading one or more vehicles onto the cargo bed of a transporting vehicle such as a pickup truck or trailer is presented. The system includes a supporting located at the front of the cargo bed above the plane of the cargo bed and one or more ramps. The ramps and the supporting are adapted to connect to and remove from each other such that the ramps are secured inside the cargo bed at an angle above the plane of the cargo bed of the transporting vehicle. This system provides additional clearance and storage space in the cargo bed. In a preferred embodiment where the transporting vehicle is a pickup truck, the supporting also functions as a headache rack or a ladder rack. A method of using this system to load one or more vehicles is also presented.

7 Claims, 15 Drawing Sheets

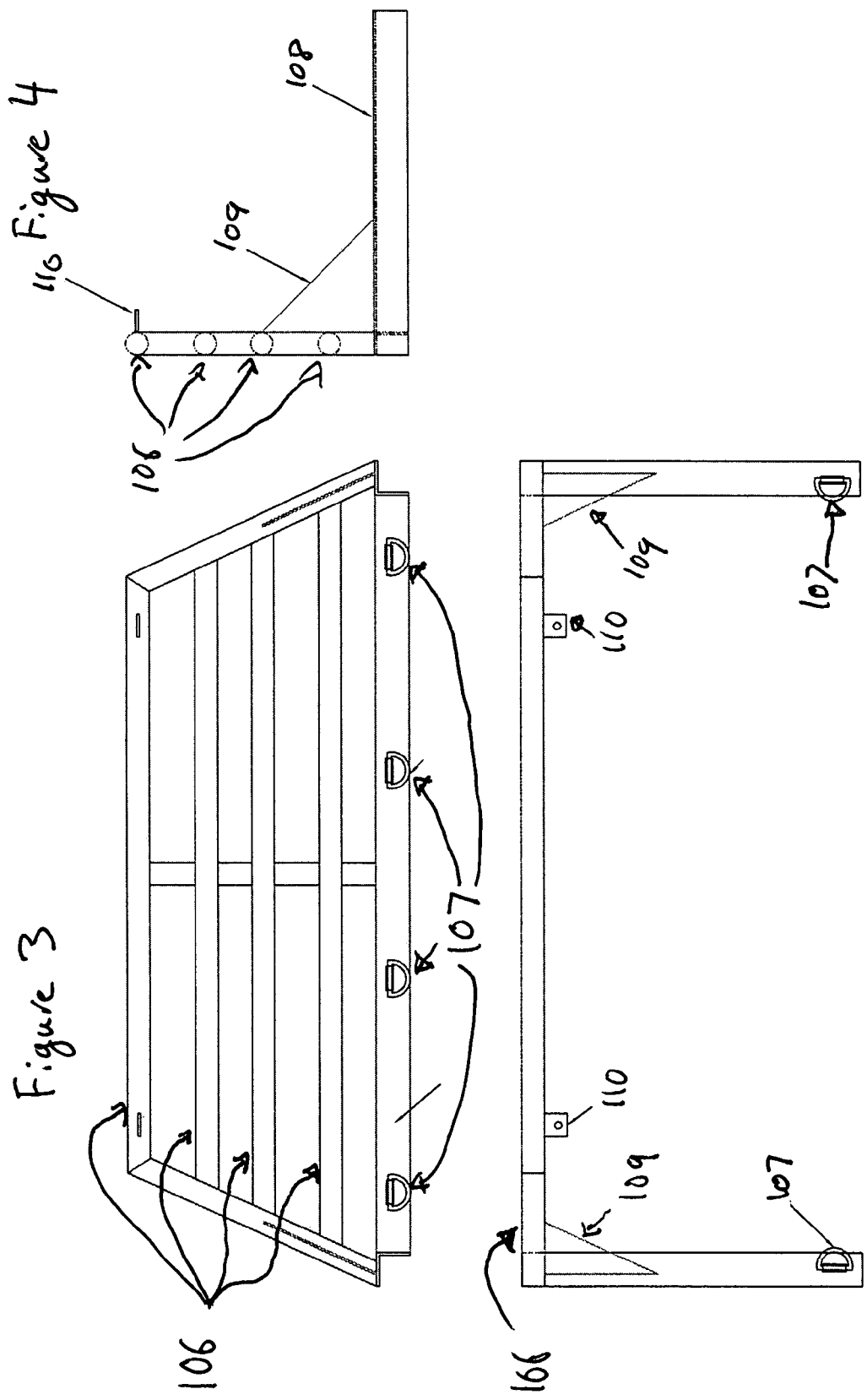

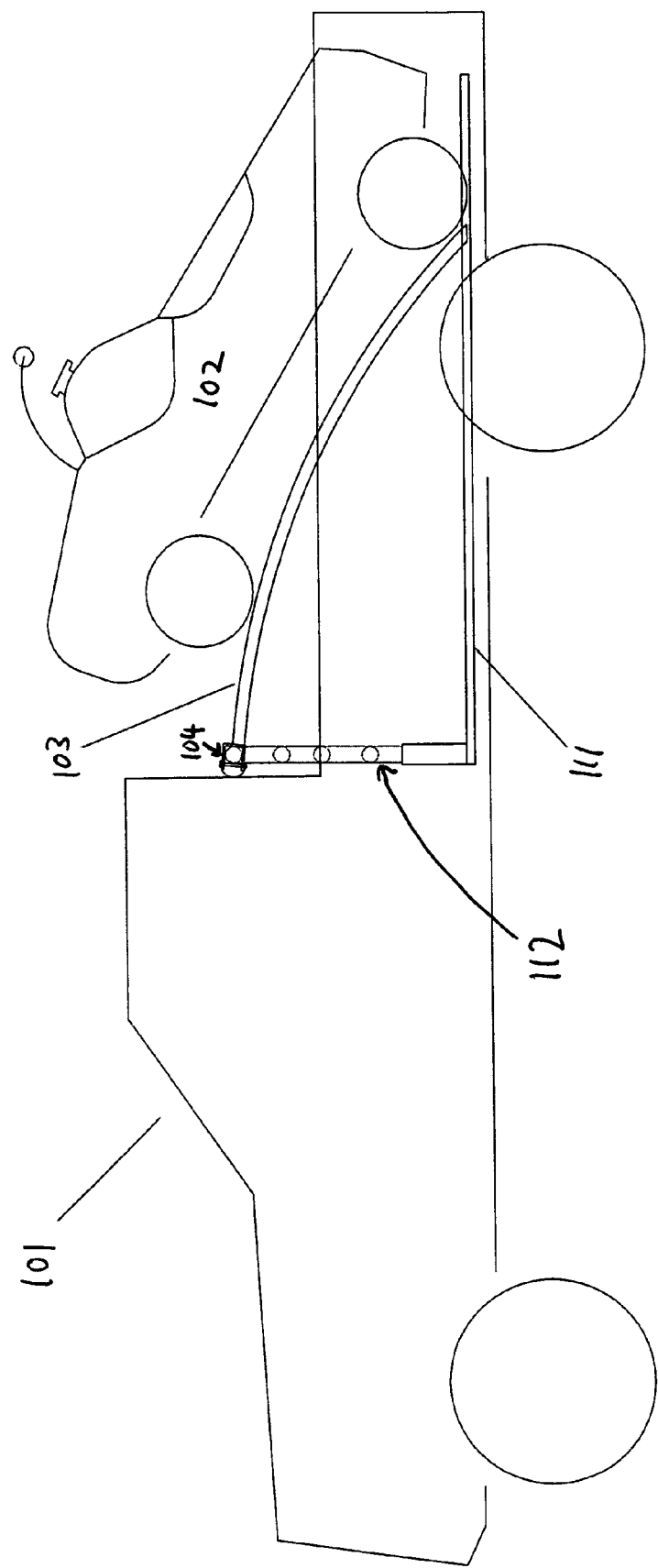

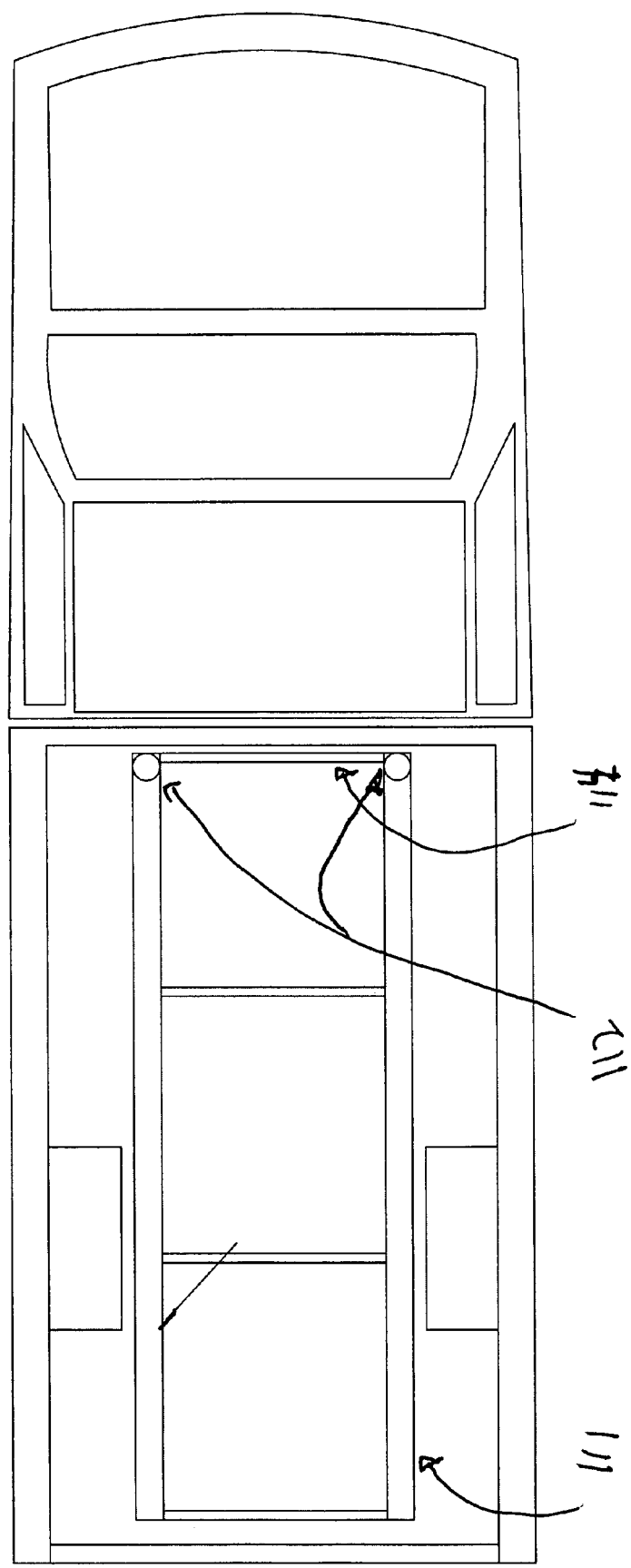

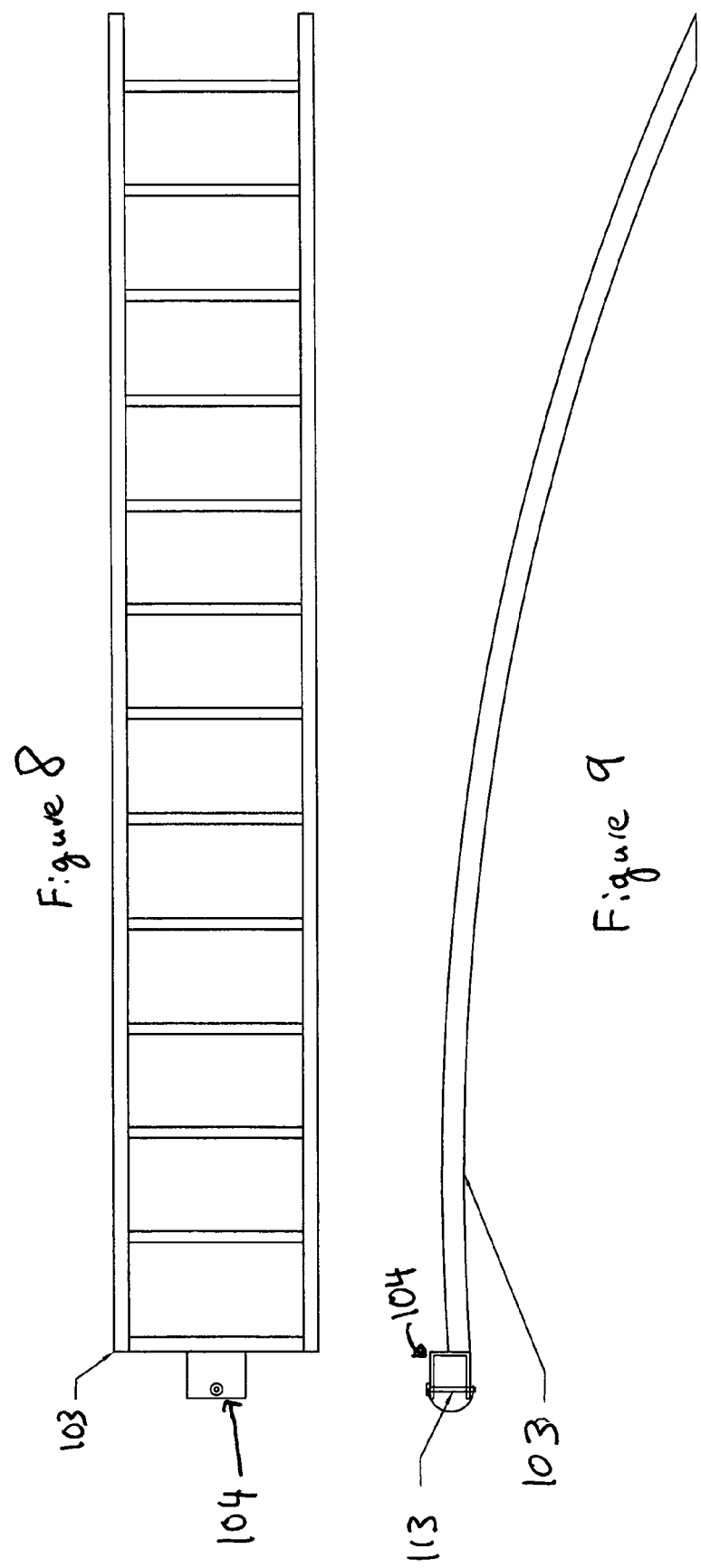

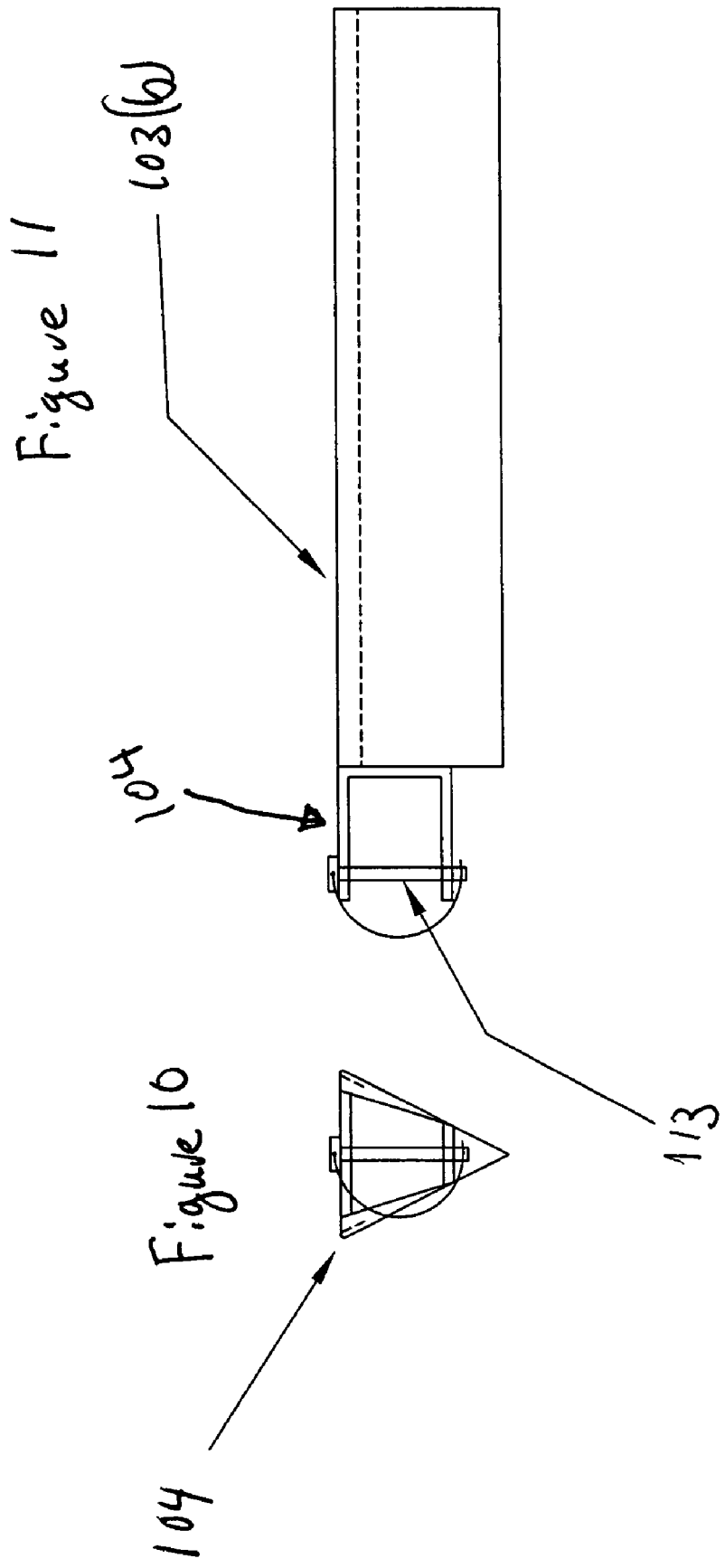

SYSTEM AND METHOD FOR LOADING VEHICLES ONTO THE CARGO BED OF A TRANSPORTING VEHICLE

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of vehicle racks and more specifically to a system and method for loading one or more one vehicles onto the cargo bed of a transporting vechicle.

Users of vehicles such as All Terrain Vechicles (hereinafter "ATV's" or "ATV"), motorboats, kyaks, boats, windsurfers, snowmobiles, motorocycles, golf-carts, go-carts, snowblowers, bicycles and the like, often face the significant challenge of how to transport these often heavy and unwieldy toys to a desired location. For example, an owner of an ATV is likely to keep the ATV in the garage. However, since the use of ATV's is generally not appropriate in urban or suburban areas, the owner must transport the ATV to an open space area before use. A similiar condition exists for the users of snomobiles. While larger boats may be stored at a boat dock, smaller motorboats, kyaks, smaller sailboats, and windsurfers are often stored at home or elsewhere and need to be transported to the desired lake, river, reservior, or ocean. While bicycles and motorcycles may be used in the city, it is often desireable to trasport them to an open are for recreational use. In particular, mountain bike enthusiasts will often want to transport their bikes and themselves out to a trailhead in a truck or car before riding.

ATV's, boats, and snomobiles, in particular, often weigh hundreds of pounds. These vehicles are also often long and bulky, and therefore it is impossible to fit them into the trunk or cabin of a typical car. These types of vehicles also will often not even fit into the cargo area of a typical Sport Utility Vehicle. For these reasons, most users prefer to trasport such vechicles in one of three ways. The first way is to place them in the cargo bed area of a flat bed pickup truck. The second way is to secure the vechicle or vehicles onto a trailer and then attach the trailer to the back of a car or truck for towing. The third way is to secure the vehicles to the roof of the transporting vehicle.

These ways of transporting vehicles face the following problems. First, generally only one larger vehicle such as an ATV, boat, or snowmobile will fit into the cargo bed of the pickup. Those desiring to transport multiple larger vehicles will generally attempt to accomplish this by to placing the first vehicle into the cargo bed of the pickup truck and transporting additional vehicles via a trailer. However, this solution is not always available because the vehicle placed in the back of the pickup is often too big to allow the tailgate of the truck to close. If the pickup tailgate cannot close, it is generally impossible to tow a trailer because the open tailgate will block access to the trailer hitch. This has become more of a problem recently due to the popularity of short bed pickups. Pickup truck beds are often made shorter to accomodate additional passenger space or make the pickup easier to drive. Second, many pickup trucks contain accessories that are attached or installed into the cargo bed area. Pickup truck owners often install or attach a heavy duty tool box, an auxiliary fuel tank, and/or a 5th wheel hitch into the cargo bed. The presence of such accessories makes it impossible (or at least more difficult) to fit a larger vehicle into the pickup's cargo bed. Third, storing a vehicle in the pickup cargo bed area substantially reduces space available to store other items. This can be particularly problematic in the context of an overnight camping trip or a group outing where additional supplies and gear will be necessary. Attaching vehicles to the roof of the transporting vehicle is a cumbersome and clumsy process for lighter vehicles like bicycles and kyaks, and it is nearly impossible for heavier vehicles like ATV's and snowmobiles. A solution particular to the challenge of transporting multiple ATV's with a pickup truck is currently on the market. It is a large, heavy rectanguloid scaffolding placed in the back of the truck with platforms adapted for ATV's on top. Apparantly, these systems are generally referred to as "ATV racks." These ATV racks are effective in transporting two ATV's on a single pickup truck cargo bed while still allowing the tailgate to close. The solution also allows for attitional items to be stored in the cargo bed below the platforms where the ATV's rest.

U.S. Pat. No. 7,014,398 issued to Mark Hellwig, discloses a racking system for transporting vehicles, such as motorcycles, bicycles, ATV, watercraft, etc. on the bed of a transporting vehicle in an "upright" position, which would apparrantly be substantially verticle. Hellwig's system includes a pair of floor plates that are firmly secured in position in the bed of a vehicle and a rack removably secured to the floor plates. The rack has a pair of spaced legs on each side thereof, the legs being removably secured to the floor plates. The legs are interconnected at top by a transverse rail with a second rail extending parallel to the first rail interconnected to one of each pair of legs below the first rail. Vertical spacing bars extend between the first and second rails adjustable therealong. In this manner, the wheels of a motorcycle, bicycle or ATV or the like may be fixedly secured between the vertical bars.

However, each of these technologies have several important drawbacks. One drawback of the "ATV rack" technology is that the scaffolding system is bulky and unwieldy, making it difficult to load, remove and store. This must be so because the scaffolding takes up the entire pickup truck cargo bed. The scaffolding is also heavy. In fact, the versions cited weigh 197 pounds. It is very difficult for a person to singlehandedly load or release one of these systems. Also, many pickup truck owners drive with one or more mounted accessories such as a truck bed tool boxes, auxiliary fuel tanks, and/or a 5th-wheel hitch in the cargo bed of the truck. Since the scaffolding system takes up substantially the entire pickup truck cargo bed area, it may not be loaded simultaneously with such accessories. Therefore, the user must release any truck bed tool box, auxiliary fuel tank, and/or 5th-wheel hitch before using this type of ATV carrying system. This can be a cumbersome task because these types of accessories are themselves generally heavy and unweildy. Plus they are usually bolted into the truck bed, so they must be unbolted before being removed.

Like the "ATV rack" system the Hellwig system, containing numerous rails, plates, and clamps is also likely to be heavy and unwieldy. It is not clear from the description if or how the Hellwig system would be able to straddle any attachments to the cargo bed area. An additional drawback to the Hellwig system is that the vehicles to be transported, which are themselves often very heavy, must be lifted into the upright position the system discloses.

BRIEF SUMMARY OF THE INVENTION

The primary object of the invention is to load vehicles onto a cargo bed such that additional space exists under the ramp that can be used for storage or to straddle an attached cargo bed accessory such as a truck bed tool box, 5th-wheel hitch, or auxiliary fuel tank.

Another object of the invention is to provide the ability to load a heavy vechicle such as an ATV while allowing the pickup truck tailgate to close, which in turn allows additional vechicles to be towed in a trailer.

A further object of the invention is to protect the back glass of the cab from being damaged by any cargo.

A further object of the invention is to load vehicles onto a ramp that will clear the wheel well of the truck or trailer allowing for additional lateral clearance.

Another object of the invention is to provide a loading system that is easy to remove, store, or transport because it is not bulky or heavy.

A further object of the invention is to optionally provide a winching mechanism attached to the supporting means help load a vehicle.

Yet another object of the invention is to optionally provide ramps that may be specially adapted for use with a particular type of vechicle such as a snowmobile, ATV, bicycle, snowmobile, motorboat, sailboat, golf-cart, go-cart, kyak, motorcycle, personal watercraft (often referred to as JET SKI™), or other similar vehicle.

Still yet another object of the invention is to provided additional clearance through the use of arched ramps.

Another object of the invention is to provide the ability to adjust the angle of the ramp by adjusting the height of the supporting means, the position where the ramps connect to the supporting means, and/or by adjusting the length of the ramp selected.

Another object of the invention is to minimize lateral movement of the ramp by placing bumps on the bottom of the ramp corresponding to the groves that are often standard on the cargo bed.

A further object of the invention is, as most newer pickup trucks have lockable tailgates, to allow the tailgate to be locked, thus making the loaded vechicle more difficult to steal.

Other objects and advantages of the present invention will become apparent from the following descriptions, taken in connection with the accompanying drawings, wherein, by way of illustration and example, an embodiment of the present invention is disclosed.

One aspect of the invention is a system for loading one or more one vehicles onto the cargo bed of a transporting vehicle comprising: a supporting means located at the front of the cargo bed and above the plane of the cargo bed and one or more ramps, wherein the one or more ramps and the supporting means are adapted to connect to and release from each other such that the ramps are secured inside the cargo bed at an angle above the plane of the cargo bed of the transporting vehicle, thereby freeing the space underneath the ramps to store additional cargo and/or straddle any attachments or installations to the cargo bed.

In another aspect of the invention, where the the trasporting vehicle is a pickup truck, the supporting means is a headache rack, and the headache rack optionally comprises series of horizontal parallel rails and the ramp is adapted to connect to the headache rack by means of a U-shaped clamp secured by a hitching pin.

In another aspect of the invention, the ramp is arched upward from the cargo bed thereby providing additional clearance underneath the one or more ramps.

In another aspect of the invention, the system includes a winch mechanism coupled with the support means, thereby aiding in the loading of the vehicles onto the one or more ramps.

Another another aspect of the invention, there is disclosed a method of using the described system for loading one or more vehicles onto the cargo bed of a transporting vehicle.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 3 is a back view of the headache rack embodiment of the invention.

FIG. 4 is a side view of the headache rack embodiment of the invention.

FIG. 5 is a top view of the headache rack embodiment of the invention.

FIG. 6 is a perspective view of the invention showing the slide-in embodiment of the invention.

FIG. 7 is top view of the base-supported embodiment of the invention.

FIG. 8 shows a ramp adapted to connect to and release from the supporting means.

FIG. 9 shows an arched ramp having a U-shaped clamp on one end.

FIG. 10 is a frontal view of a U-shaped clamp secured by a hitching pin.

FIG. 11 is a side view of a ramp having a U-shaped clamp secured by a hitching pin.

DETAILED DESCRIPTION OF THE PREFERRED EMBODIMENTS

Figure 1:
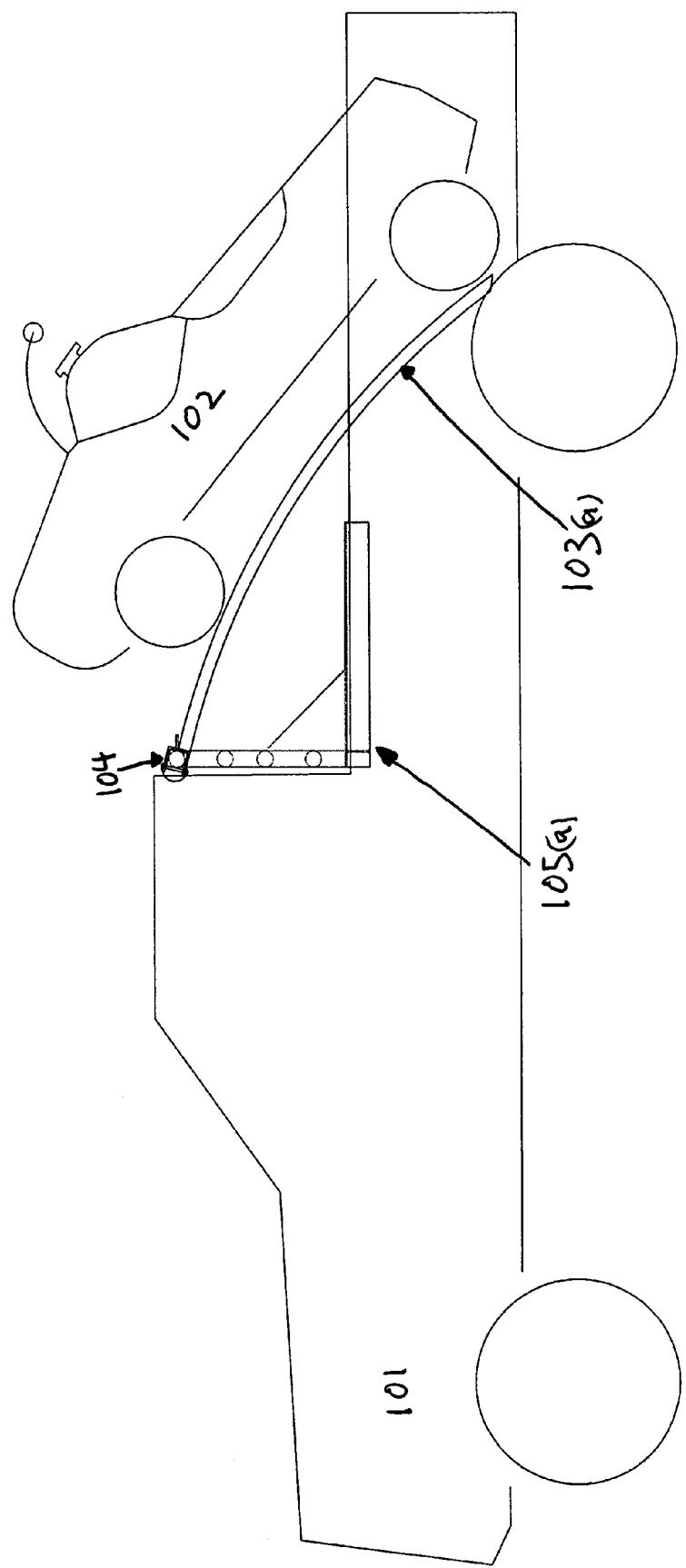
FIG. 1 is a perspective view of the invention showing the headache rack embodiment with arched ramps.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

A system for loading one or more one vehicles 102 onto the cargo bed of a transporting vehicle 101 is provided. The system includes a supporting means 105(a-b), 115 located at the front of the cargo bed above the plane of the cargo bed and one or more ramps. The ramps 103(a-b) and the supporting means 105(a-b), 115 are adapted to connect to and release from each other such that the ramps are secured inside the cargo bed at an angle above the plane of the cargo bed of the transporting vehicle 101. This invention may be used to load many different types of vehicles 102. Examples of suitable vechicles to be loaded include, without limitation, ATV's, kayaks, motor boats, sail boats, bicycles, tricycles, motorcycles, windsurfers, lawnmowers, golf carts, go-carts, canoes, snowblowers, personal watercrafts (oftern called JET SKi's ™), and snowmobiles. The vehicle 102 may be secured to the ramp 103(a-b) through means that are well known. For example, it may be tied with ropes, chains, or bungy cords. Preferrably, one or more tie-down clamps 107 are provided to faciliate the securing of the one or mor vehicles 102. The vehicle 102 may also be locked or clamped to the ramp 103(a-b) by means that are well known.

As used herein, the term "transporting vehicle" refers to a vehicle such as a pickup truck, trailer 201, full sized van, or other vehicle adapted to transport large items. The term "cargo bed" refers to a portion of a vehicle adapted to store relatively large items. The best examples applicable to the preferred embodiments of this invention are the cargo box of a usual pickup truck (which has bed rails enclosing a substantially flat area), flat bed area of a flat bed pickup truck (which is not enclosed), or the flat bed area of a trailer 201, but the definition would also include the storage area of a full size van or other transporting vehicle adapted to haul large items. The definition of "cargo bed" does not include enclosed areas adapted to carry relatively small items, for example, the trunk of a typical car or the storage area of a usual Sport Utility Vehicle (SUV).

As to ramps, there are many types that one of ordinary skill in the art would be able to routinely adapt for use with this invention. Preferably, the ramps may be adapted for use with the specific vechicle to be used. Ramps adapted for use with ATV's, bicycles, and motorcycles are currently known, see U.S. Pat. No. 7,100,232 issued to Zhang. However, a simple flat piece of material strong enough to support the weight of the vehicle to be carried would be sufficient. Optionally, the ramp or ramps may be arched outward 103(a) (where the center of the radius of curvature is below the ramp) so as to allow additional clearance underneath the ramp. Structure 103(b) comprises an unarched ramp. Where the transporting vehicle 101 is a pickup truck, this arching would help allow the tailgate to close. Preferrably, the ramp selected would be specially adapted for the type of vehicle to be transported. For instance, for vehicles with wheels the ramp or ramps would preferably comprise U-shaped channels sized appropriately to fit the wheel of the desired vehicle. Additionally the tops of the U-shaped channels would have rolled edges to minimize friction between the channel and the wheel of the vehicle. For motorcycles, the ramps would optionally include kick stand pockets. Kick stand pockets are depressions in the ramp positioned to the side of the channel of the ramp adapted to fit the kick stand of a typical motorcycle. The kick stand pockets help stabilize the motorcycle during travel.

The supporting means 105(a-b) 115 may comprise many different means known by one of ordinary skill in the art to support the weight to be carried on the ramp. The supporting means 105(a-b) 115 could be, without limitation, one or more hooks, clamps, pins, hitches, bolts, chains, bars, rails, or some combination thereof. The supporting means may be made out of any kind of steel or iron, aluminum, a sturdy metal alloy, a carbon composite, wood, a strong plastic or other synthetic, or other such matererial suitable to carry a significant load. The supporting means 105(a-b) 115 may be attached or installed to the roof, back or sides of the transporting vehicle. Where the transporting vehicle is a pickup truck, the supporting means may also be attached to the bed rails of the pickup truck or stem from an appartus that is supported by the bed rails of the cargo bed or the floor of the cargo bed.

Where the transporting vehicle is a pickup truck, the supporting means preferably comprises a headache rack adapted for use with this invention 105(a-b). A "headache rack" is an after market pickup truck accessory generally used to protect the rear glass window of a pickup truck from being broken or scratched by any cargo stored in the pickup truck cargo bed. It was named "headache rack" because it functions to prevent the driver from being hit in the head by an object breaking through the back glass. Various types of headache racks are currently known. Most headache racks are mounted to the pickup truck's bed rails, although they could be mounted to the roof of the truck, the cargo bed floor, or the sides of the cab. FIG. 4 shows a side view of such a headache rack embodiment; FIG. 5 shows a top view; and FIG. 3 shows a back view. The headache rack in this embodiment has an element that rests on the bedrails 108, further supported by a diagonal brace 109. The supporting means for the ramp in this embodiment are the horizontal parallel rails 106. Structure 110 is an optional support for lighting or other attachments. Structure 105(a) illustrates a headache rack supporting means with a high profile. Structure 105(b) illustrates a supporting means with a low profile.

In an alternative embodiment, the supporting means comprises a rectangular base member 111 resting on the cargo bed adapted to perpendicularly secure two support beams 112 at two of the corners of the rectangular base member, the two support beams being connected to each other by one or more horizontal rails 114, the horizontal rails being adapted to connect to and release from the one or more ramps 103(a-b). Preferably, the This embodiment would allow the user to have a supporting for the ramps without having to have a headache rack type apparatus affixed to the cargo bed of the transporting vehicle and it would still allow a truck bed tool box 202, 5$^{th}$-wheel hitch 203, auxiliary fuel tank 206, or other accessory to remain attached to the cargo bed.

The supporting means may also optionally comprise a ladder rack 205. A ladder rack 205 is an aftermarket scaffolding type apparatus generally affixed such that it sets above the cargo box of a pickup truck or above the roof of a van. Ladder racks 205 are particularly popular among contractors in the areas of construction, painting, handywork and the like. They are called ladder racks because they are often used to secure a ladder for transport, ladders being necessary for professionals in these areas. In accordance a preferred embodiment of the present invention, where the transporting vehicle comprises a pickup truck, the the supporting means comprises a ladder rack 205. The ramp or ramps 103(a-b) and the ladder rack would be adaptable to connect to and release from the ladder rack 205. One of ordinary skill in the art would recognize numerous designs by which the ramps and the ladder rack 205 may be so adapted. Optionally, since many currently available ladder racks include at least one horizonal rail running across the front of the cargo bed near the rear glass of the truck, the ramps may be adapted to connect to and release from the horizontal rail in one of numerous ways recognizable to one or ordinary skill in the art. One possible design would be to implement the same type of U-shaped clamp 104 coupled with a hitching pin 113. This optional design will be further discussed.

The ramps and the supporting means are adapted to connect to and release from each other such that the ramps are secured inside the cargo bed at an angle above the plane of the cargo bed of the transporting vehicle 101. The angle between the floor of the cargo bed and the ramp may vary widely. Optimally, the angle would range between 20 degrees and 65 degrees. Preferably, where the transporting vehicle 101 is a pickup truck, the angle should be large enough to allow the tailgate of the pickup truck to close. Most pickup truck cargo beds are set low enough that there is a wheel weel protruding into the cargo bed. In accordance with another preferred embodiment, the angle is large enough to clear the wheel well, giving the user the ability to place more or wider ramps in the cargo bed.

Various forms of pickup truck bed accessories are popular today. Among these are pickup truck tool boxes, 5th-wheel hitches 203, and auxillary fuel tanks 206. These accessories are generally mounted into the truck bed; they are large, heavy and unweildy; and they would require considerable effort to remove. In another preferred embodiment where the transporting vehicle is a pickup truck having an attachment protruding into the cargo bed area, the angle between the plane of the floor of the cargo bed is large enough to allow the ramp or ramps to clear the attachment.

Figure 2:
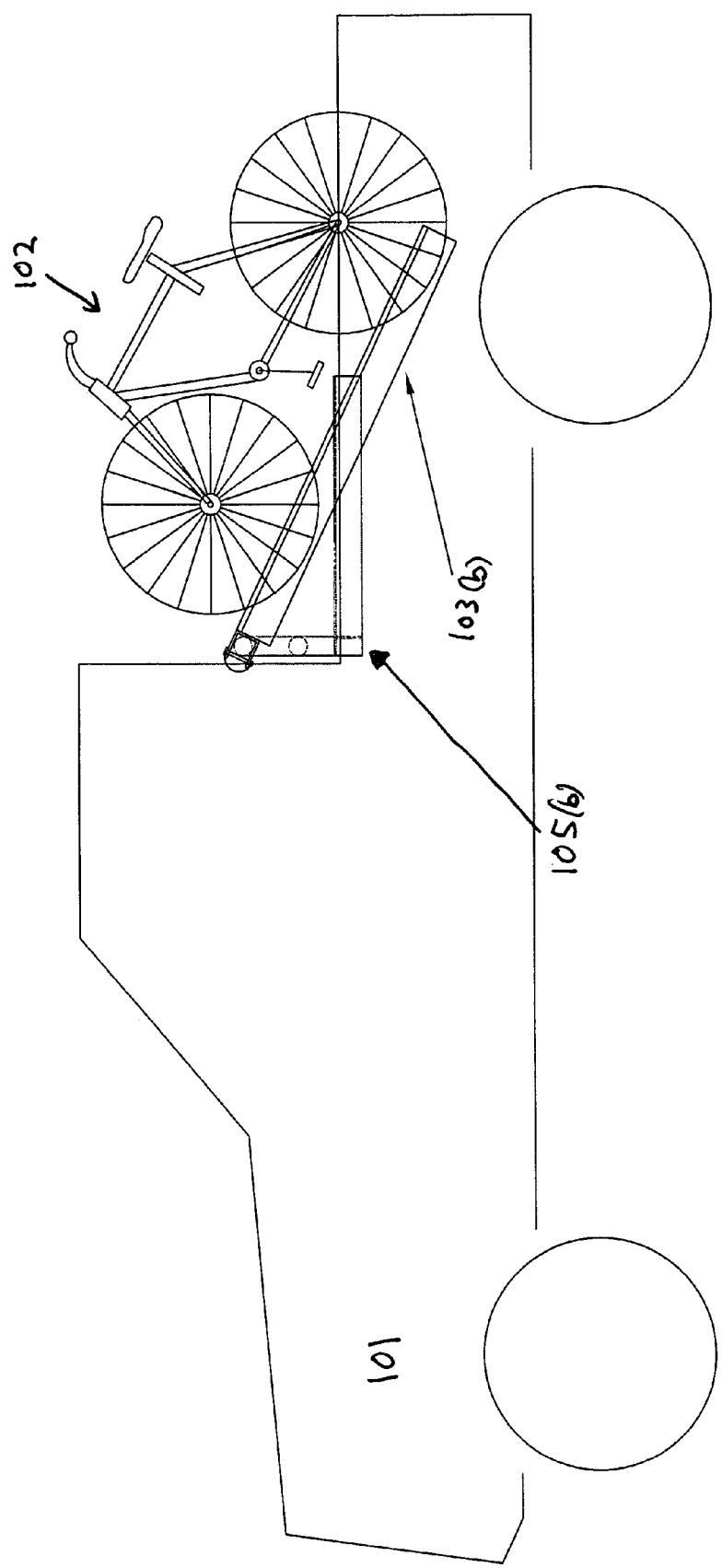
FIG. 2 is a perspective view of the invention showing a lower angle and a straight ramp.
Figure 12:
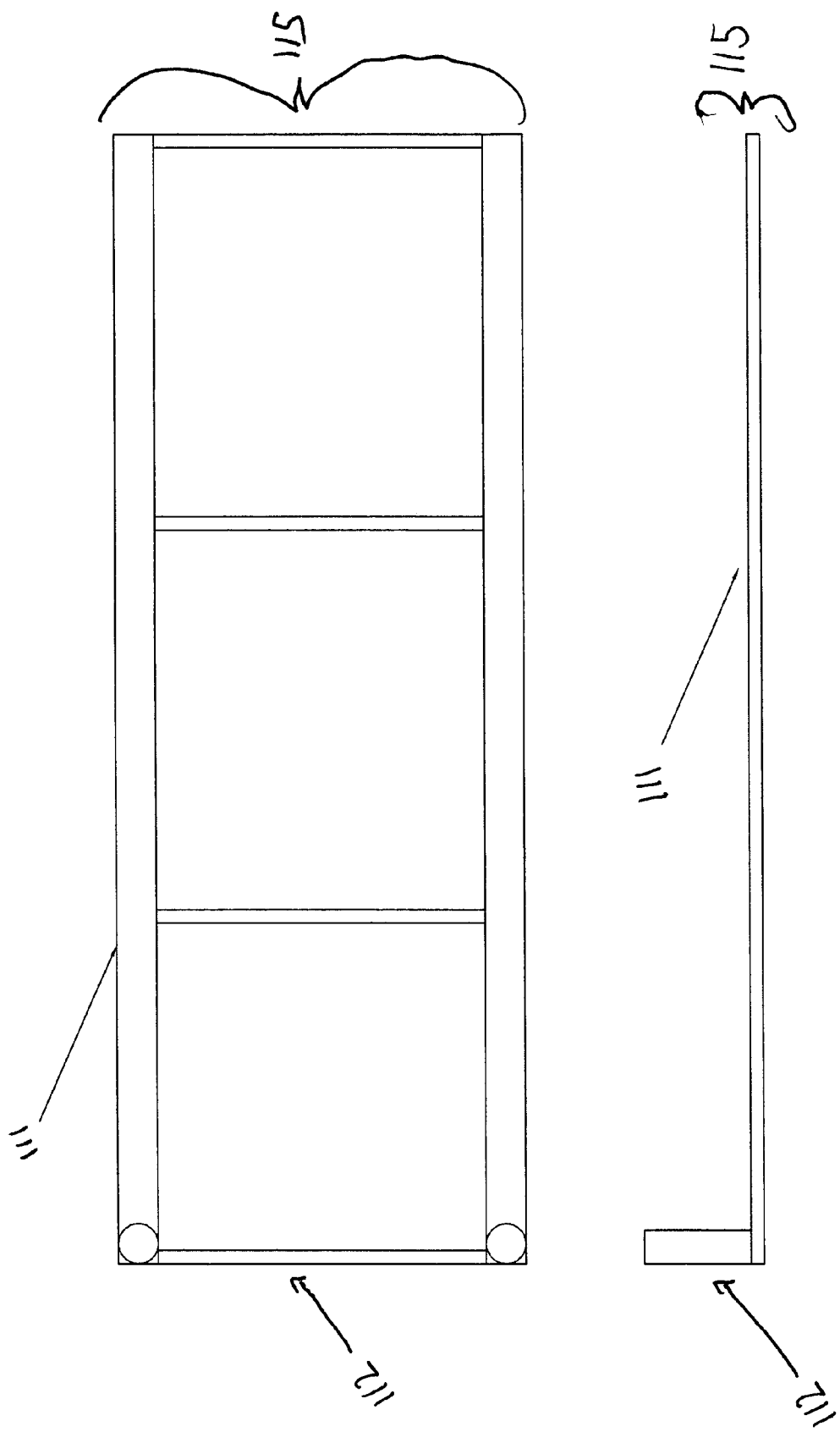
FIG. 12 shows a design of the base-supported embodiment.
Figure 13:
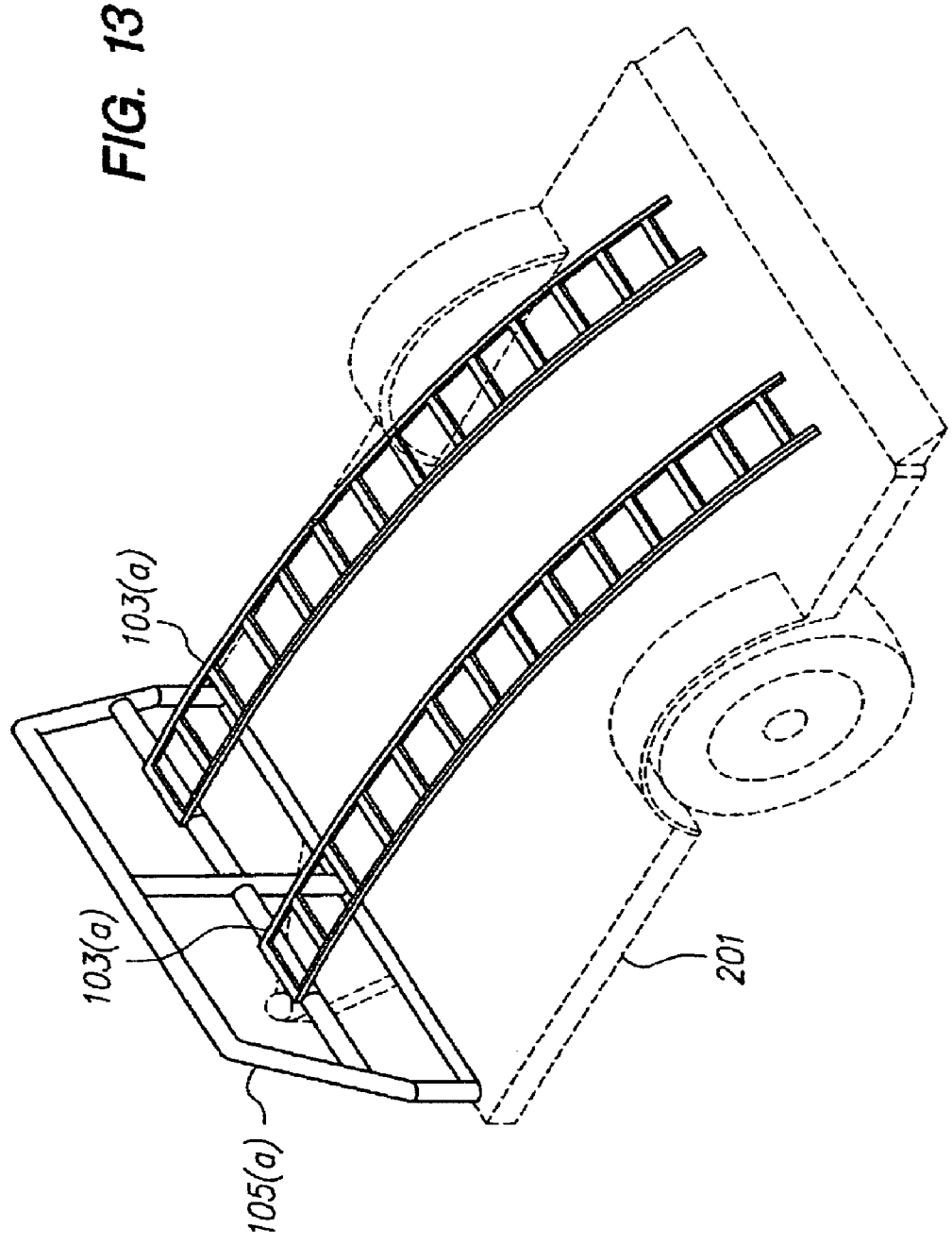
FIG. 13 shows an embodiment of the invention including a trailer.
Figure 14:
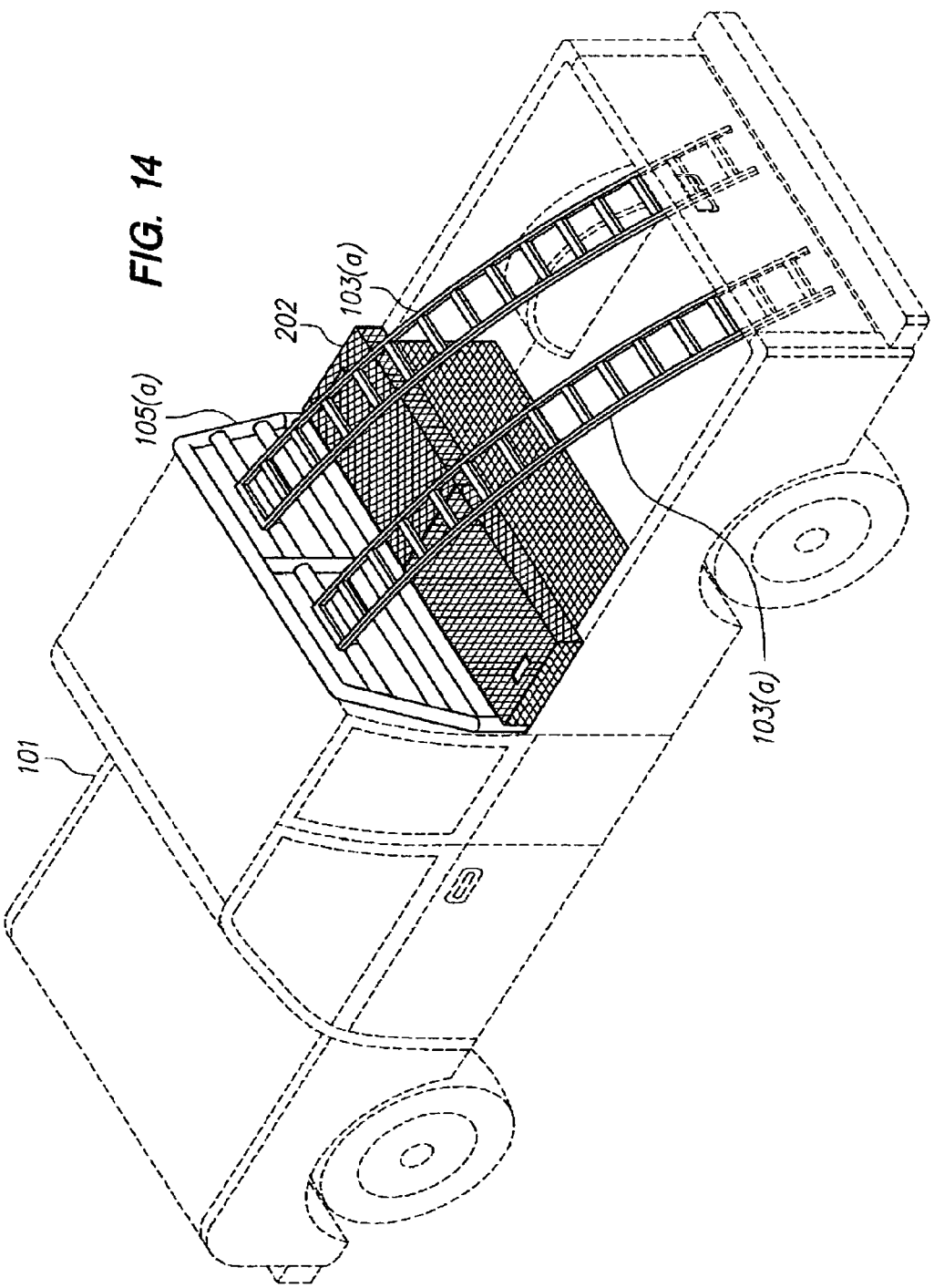
FIG. 14 shows an embodiment of invention including a truck-bed tool box.
Figure 15:
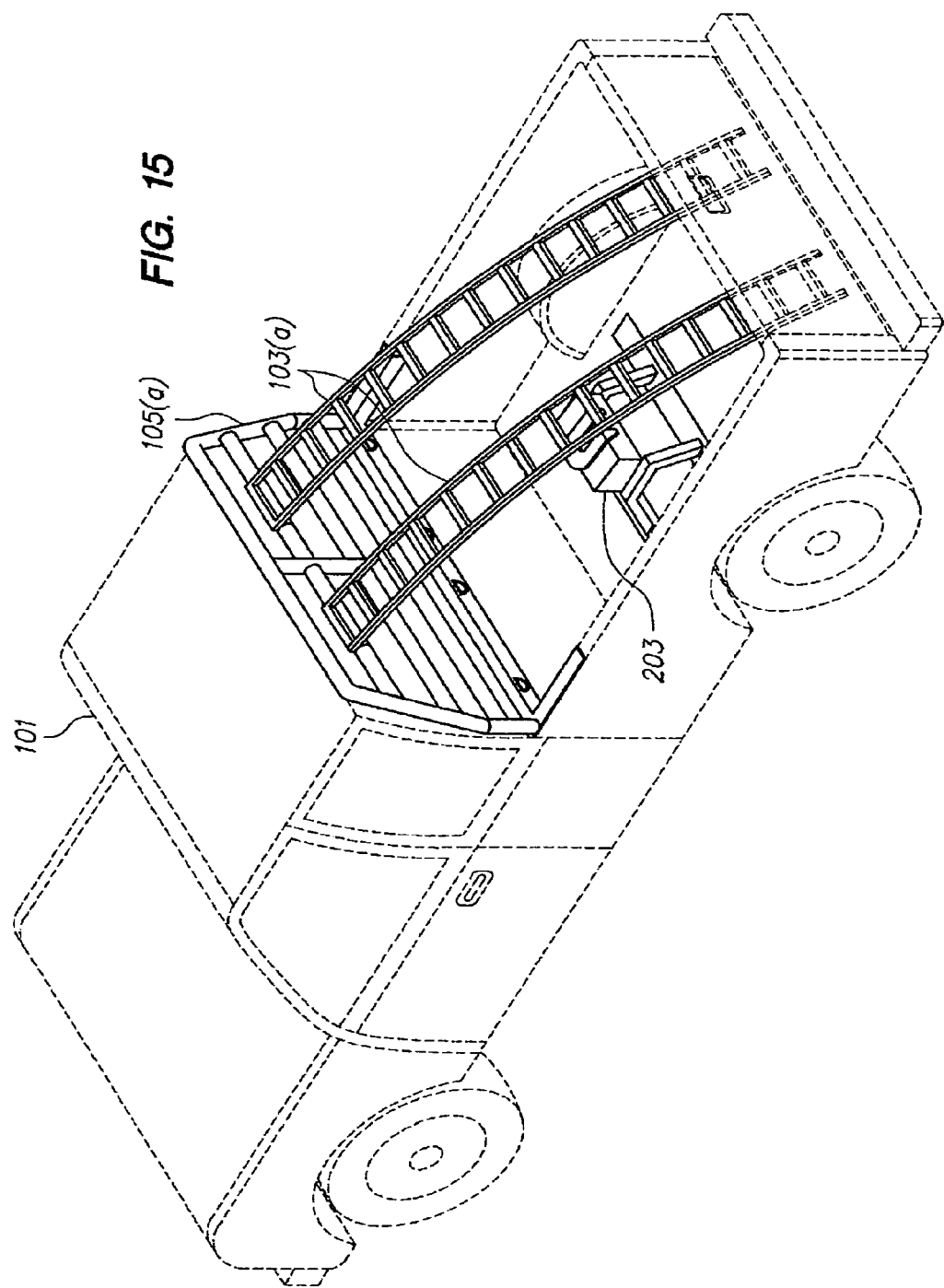
FIG. 15 shows an embodiment of the invention including a $5^{th}$-wheel hitch.
Figure 16:
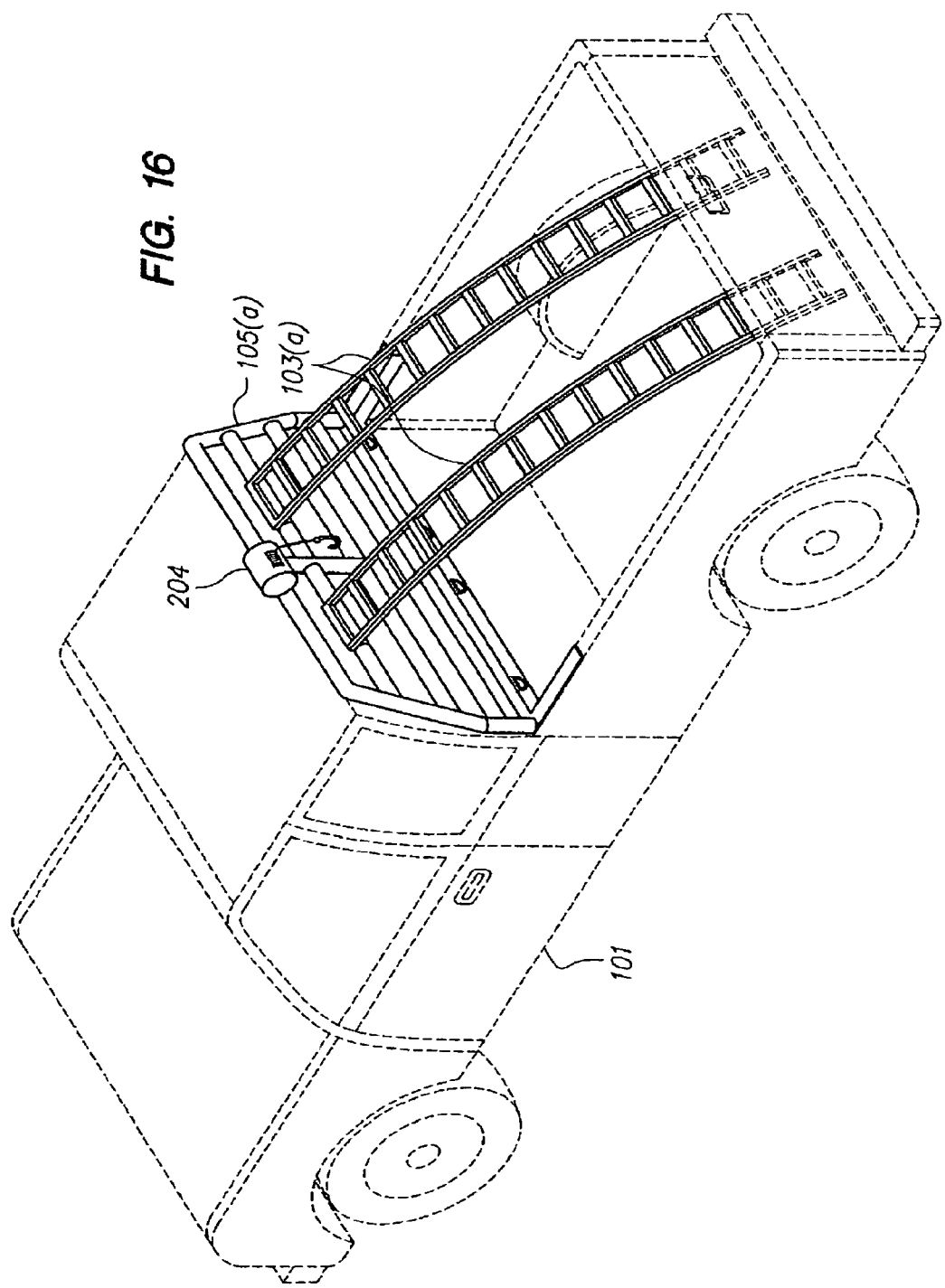
FIG. 16 shows an embodiment of invention including the winch mechanism.
Figure 17:
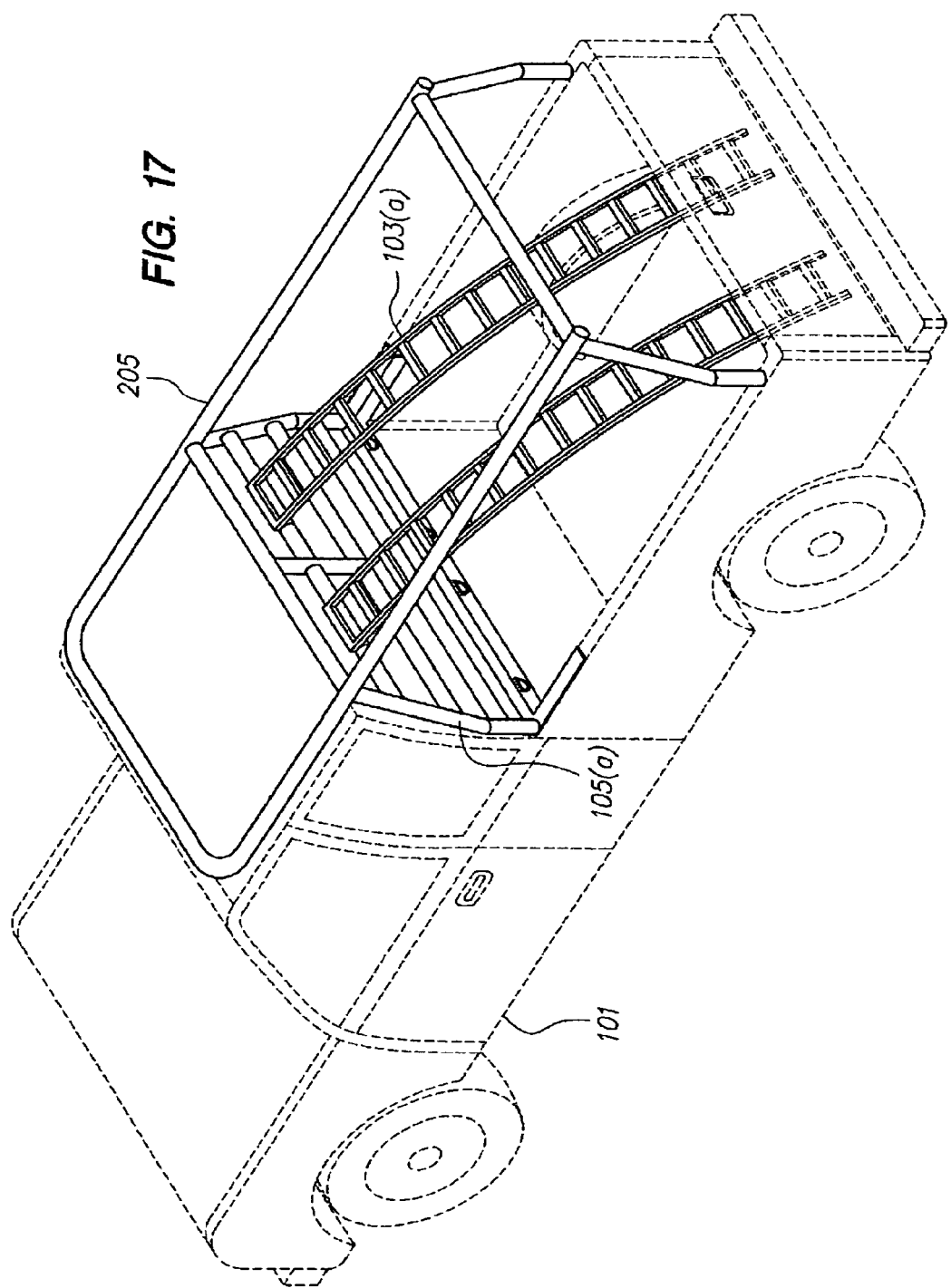
FIG. 17 shows an embodiment of the invention including a ladder rack.
Figure 18:
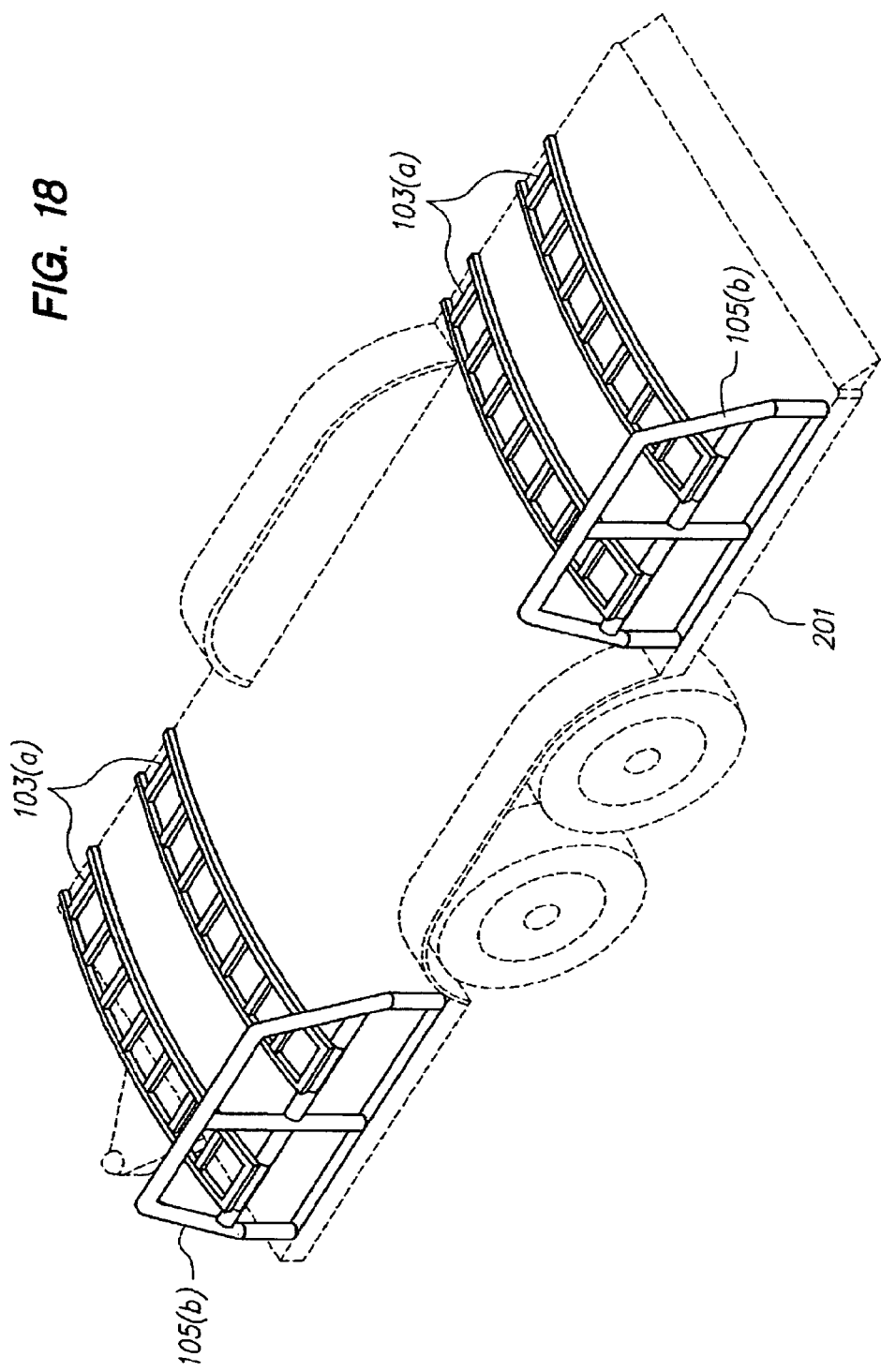
FIG. 18 shows an alternative embodiment of the invention including a trailer.
Figure 19:
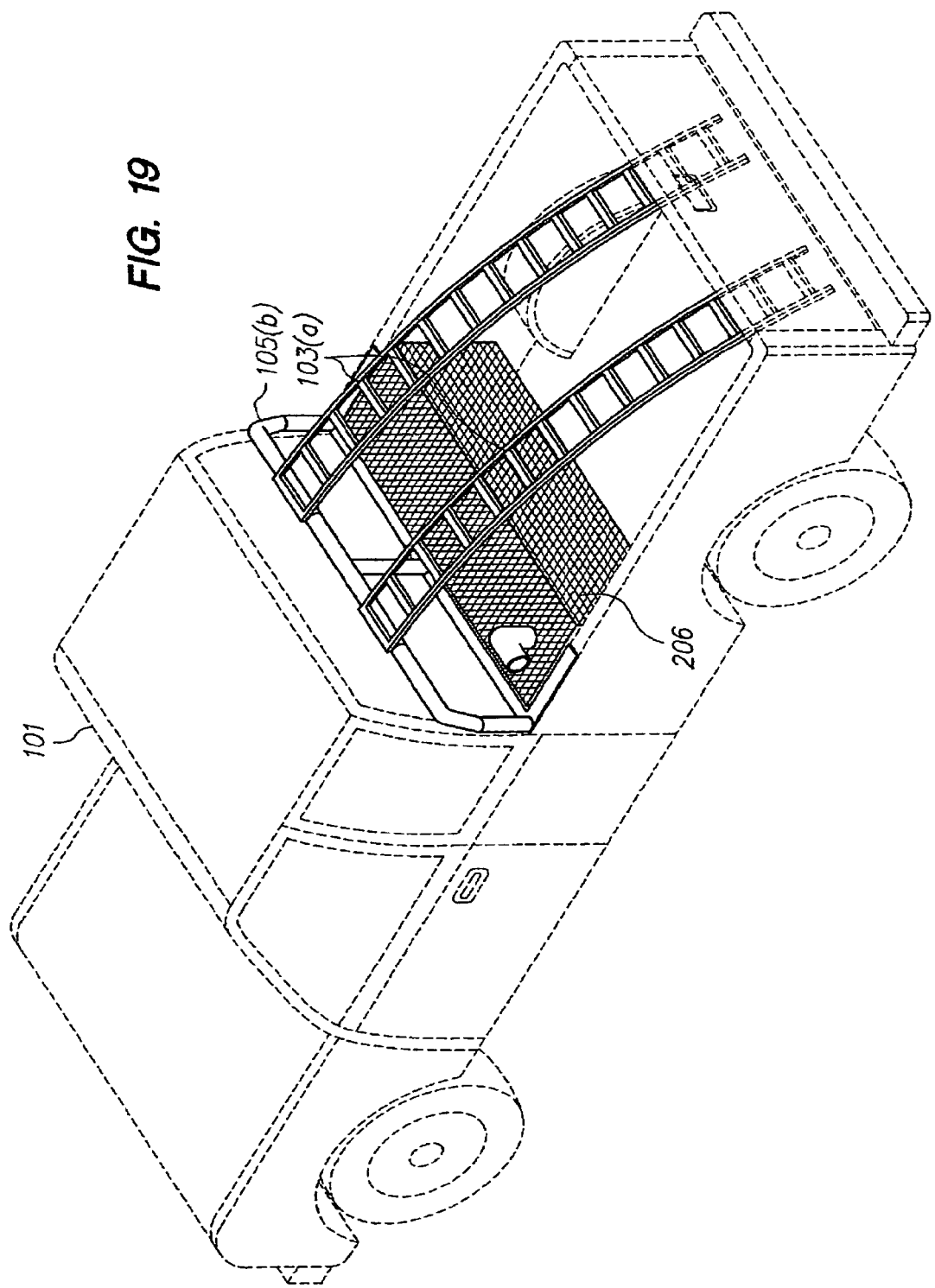
FIG. 19 shows an embodiment of the invention including an auxiliary fuel tank.

One having ordinary skill in the art will recognize many potential designs by which the supporting means and the ramp may be adapted to connect to and release from each other. In a preferred embodiment, the ramps and the supporting means are adapted to connect to and release from each other in the following way: the supporing means comprises one or more horizontal parallel rails 106 or 114 mounted to or placed inside the transporting vehicle 101, and the one end of the ramp includes a U-shaped member 104 connected to one end of the ramp and sized to straddle one of the rails 106 or 114. The U-shaped member 104 contains holes on two or more holes adapted to fit a hitching pin 113. The U-shaped member 104 is secured to the rail by first straddling the rail with the U-shaped member 104 and then sliding the hitching pin 113 through the holes in the U-shaped member 104 while the U-shaped member 104 is straddling the rail. FIGS. 10 and 11 best demonstrate this embodiment. Where the transporting vehicle 101 is a pickup truck, the supporting means may optionally comprise a headache rack 105(a-b) including one or more substantially parallel horizontal rails 106 adapted to connect to and release from the ramps 103(a-b) as described. Providing more than one horizontal rail allows the user to adjust the angle between the plane of the cargo bed and the plane of the ramp by switching which rail the ramp is connected to. Connecting to a higher bar will increase the angle. The capability to alter the angle is valuable because for some application a smaller angle is more desireable while for other applications a larger angle is more desirable. A smaller angle will generally allow for the vehicle to be loaded and secured more easily. A larger angle provides additional clearance and potential storage space underneath the ramp. FIGS. 1 and 2 demonstrate this contrast. In FIG. 1 the angle is relatively large because the connection is relatively high while in FIG. 2 the angle is smaller because the connection is lower. Also, having a larger angle may be necessary to fit a larger vehicle such as an ATV into a smaller cargo bed while allowing the tailgate to close. The angle may also be altered by the selection of a ramp 103(a-b) of a different length. Given a supporting means at a constant height, a shorter ramp will lead to a larger angle between the ramp and the cargo bed floor. A longer ramp selection will create a smaller angle.

In an optional aspect of the invention, the supporting means may be coupled to a winch 204 to aid in hoisting a vehicle onto the ramp. A winch 204 is a motor-driven or hand-powered machine used for hoisting or hauling, having a drum around which is wound a rope, cable, or chain attached to the load being moved. Where the supporting means comprises a headache rack of the type described above, the winch 204 is preferably coupled to the headache rack comprising the supporting means though attaching the winch 204 to a winch plate. A winch plate comprises two polygonal members sandwiched around the one or more of the rails of headache rack described above. The polygonal members are bolted or welded to each other to connect with the rail or rails. One of the polygonal members is connected to winch 204.

In another optional aspect of the invention where the cargo bed of the transporting vehicle has longitudinal parallel groves, wherein the side of the ramp not connected to the headache rack further comprises a series of bumps adapted to fit into the longitudinal parallel groves. Such logitudinal parallel grooves are common among pickup trucks on the market. The each of the groves is generally approximately 1-2 inches wide and one half inch to 2 inches deep. This provides additional stabilty to the system by minimizing any lateral movement of the ramp.

A method for using the system provided to load one or more one vehicles 102 onto the cargo bed of a transporting vehicle 101 is also provided. The method comprises the steps of: providing a supporting means 105(a-b) 114 located at the front of the cargo bed above the plane of the cargo bed and one or more ramps 103(a-b) wherein the one or more ramps 103(a-b) and the supporting means 105(a-b) 114 are adapted to connect to and release from each other such that the ramps are secured inside the cargo bed at an angle above the plane of the cargo bed of the transporting vehicle 101; connecting one end of the ramp 103(a-b) to the supporting means 105(a-b) 112; moving the one or more vehicles 102 onto the one or more ramps 103(a-b); securing the one or more vehicles 102 onto the one or more ramps 103(a-b), whereby additional storage space is available on the cargo bed underneath the one or more ramps. Preferably, an additional ramp leading from the ground to the plane of the cargo bed would be provided. This way, the the one or more vehicles 102 would be moved onto the one or more ramps 103(a-b) by moving one of the one or more vehicles 102 from the ground up the additional ramp to the plane of the cargo bed and then up one of the one or more ramps 103(a-b). The vehicle or vehicles 102 may be moved onto the ramp by many different means. They could be driven up, pulled up, pushed up, lifted onto the ramp, The vehicle or vehicles 102 may be secured to the ramp 103(a-b) through means that are well known. For example, it may be tied with ropes, chains, or bungy cords. The vehicle may also be locked or clamped to the ramp by means that are well known. Where the transporting vehicle 101 comprisises a pickup truck having a standard type tailgate the method further comprises the step of closing the tailgate.

The invention provides several advantages compared to current related technologies, although all advantages are not necessarily present in every embodiment of the invention. One of these advantages is that the system and method provided loads vehicles onto a cargo bed such that additional storage space exists under the ramp. This would be particularly advantageous in the context of an overnight camping trip or a group outing where siginificant additional gear would be needed.

Another advantage is the ability to load a heavy vechicle such as an ATV while allowing the pickup truck tailgate to close. As discussed in the background, ATV's boats, snowmobiles and other large vehicles are often to long to fit into the tailgate of the pickup truck to close. This is especially a problem for trucks where the length of the cargo bed is relatively short (called short box trucks). Currently, some people faced with this problem will simply drive the transporting vehicle to the desired location with the desired vehicle in the cargo bed and just leave the tailgate open (hopefully tying the vehicle down very well). By ramping the vehicle up at an angle, the likelihood of the vehicle fitting into the cargo bed is increased significantly. Also, allowing the tailgate to close allows additional vechicles to be towed in a trailer 201 because an open tailgate blocks access to a typical trailer hitch. Plus, as most newer pickup trucks have lockable tailgates, this invention will allow the tailgate to be locked, thus making the loaded vechicle more difficult to steal.

Additionally, placing the vehicle on an angled ramp provides the ability to straddle any accessories installed or attached to the inside of the pickup truck or trailer cargo bed area. This gives the user of this invention the added convenience of not having to remove and re-attach the accessories respectively before and after hauling a vehicle. Popular installed or attached accessories include truck bed tool boxes 202, auxiliary fuel tanks 206, and 5th-wheel hitches 203. The angled ramp may also clear the wheel well of the truck or trailer allowing for additional lateral clearance. This lateral clearance will provide the user with the opportunity to load and transport more vehicles and/or wider vehicles than would otherwise be possible.

Since headache racks and ladder racks currently on the market may be adapted to comprise the supporting means in accordance with the present invention, a person already having a headache rack or ladder rack already installed may not need to purchase or install additional equipment to take advantage of this invention. For example, a contractor having an installed ladder rack for use with his business could utilize his existing ladder rack to connect one or more properly adapted ramps to more advantageously go ATV riding or snomobile riding on the weekend.

The present invention also effecutates a lower center of gravity compared to the ATV racks or to placing the vehicle to be transported on the roof of the transporting vehicle. A lower center of gravity makes the transporting vehicle easier and safer to drive. Unlike with the ATV racks on the market, the application of the present invention will not obscure the drivers view looking at the right and left rear view mirrors because the transported vehicles do not protrude out from the sides of the cargo bed during travel.

Finally, unlike the vehicle racking systems currently on the market and disclosed in the patent literature, this system is easy to attach, remove, store, and transport because it is not bulky or heavy. The other solutions disclosed, such as the ATV racks and the vehicle racking system disclosed by Wellwig, comprise bulky, heavy, and unwieldy scaffolding type mechanisms. This invention includes a mere ramp adaptable to connect to and release from a supporting means. The ramp may fold up, and it may be made of relatively light-weight material such as alluminum. One person will be able to connect and remove the ramps with relative ease. The supporting means may conveniently remain on the transporting vehicle, or it may be removed and re-attached through means well known to one of ordinary skill in the art.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A system for loading one or more vehicles onto a pickup truck, the pickup truck having a cargo bed, comprising:
   a supporting means located above the cargo bed; and
   one or more ramps; wherein the one or more ramps and the supporting means are adapted to connect to and release from each other such that, when connected to the supporting means, an end of each ramp that is not connected to the supporting means rests on the cargo bed such that an angle is formed between the cargo bed and each of the one or more ramps; and
   wherein the supporting means comprises a headache rack capable of supporting the one or more ramps at two or more different heights.

2. A system as claimed in claim 1 wherein the one or more ramps are arched upward from the cargo bed.

3. A system as claimed in claim 1 wherein the headache rack includes one or more horizontal parallel rails and the one or more ramps are adapted to connect to the one or more horizontal parallel rails through a U-shaped clamp connected to one end of each of the one or more ramps coupled with a hitching pin.

4. A system as claimed in claim 1 further comprising a winch mechanism coupled with the supporting means.

5. A system as in claim 1, wherein the headache rack includes two or more horizontal parallel rails.

6. A system for loading one or more vehicles onto a pickup truck, the pickup truck having a cargo bed, comprising:
   a supporting means located above the cargo bed; and
   one or more ramps; wherein the one or more ramps and the supporting means are adapted to connect to and release from each other such that, when connected to the supporting means, an end of each ramp that is not connected to the supporting means rests on the cargo bed such that an angle is formed between the cargo bed and each of the one or more ramps; and wherein the supporting means comprises a ladder rack capable of supporting the one or more ramps at two or more different heights.

7. A system as in claim 6, wherein the ladder rack includes two or more horizontal parallel rails.

\* \* \* \* \*